United States Patent
Glazer et al.

(10) Patent No.: US 9,043,807 B2
(45) Date of Patent: May 26, 2015

(54) APPLICATION GATEWAY IN A BROWSER BASED ENVIRONMENT

(75) Inventors: Arieh Glazer, Migdal Haemek (IL); Ohad Eder-Pressman, San Francisco, CA (US); Vincent Le Chevalier, San Jose, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 99 days.

(21) Appl. No.: 13/562,108

(22) Filed: Jul. 30, 2012

(65) Prior Publication Data
US 2014/0033226 A1    Jan. 30, 2014

(51) Int. Cl.
*G06F 9/54* (2006.01)
*H04L 29/06* (2006.01)

(52) U.S. Cl.
CPC ...... *G06F 9/54* (2013.01); *G06F 9/542* (2013.01); *H04L 69/162* (2013.01)

(58) Field of Classification Search
CPC .......... G06F 9/54; G06F 9/542; H04L 69/162
See application file for complete search history.

(56) References Cited

U.S. PATENT DOCUMENTS

| | | | |
|---|---|---|---|
| 5,305,454 A | * | 4/1994 | Record et al. ................. 719/318 |
| 2004/0064821 A1 | * | 4/2004 | Rousselle ..................... 719/310 |
| 2006/0053224 A1 | * | 3/2006 | Subramaniam ............... 709/227 |
| 2010/0318832 A1 | * | 12/2010 | Zeigler et al. ..................... 714/2 |

* cited by examiner

*Primary Examiner* — H S Sough
*Assistant Examiner* — Syed Roni
(74) *Attorney, Agent, or Firm* — Fenwick & West LLP

(57) ABSTRACT

An application gateway enables controlled communication between application components within a browser based environment while maintaining a level of isolation of the individual application components. A dispatching API wrapper and a listening API wrapper are registered for each of a plurality of application components. The registered API wrappers are used to send and receive communications from the associated application components. For example, a first application component can dispatch an action to a second application component via the first application component's dispatching API wrapper. The second application component can receive the action via the second application component's listening API wrapper. As another example, a first application component can dispatch an event that broadcasts a state to other application components via the first application component's dispatching API wrapper. A listening API wrapper of at least one other application component receives the state and may perform other functions dependent on the state.

16 Claims, 5 Drawing Sheets

APPLICATION GATEWAY IN A BROWSER BASED ENVIRONMENT

CROSS REFERENCE TO RELATED APPLICATIONS

This application is related to U.S. Utility application Ser. No. 13/253,011, which is incorporated by reference in its entirety.

BACKGROUND

1. Field of the Invention

This invention relates to providing communication between isolated application components in a browser based environment.

2. Description of the Related Art

A new generation of HTML5 capable browsers are shifting application publishing from a traditional stand-alone desktop application model to a web-based model where applications exist within their client browser environments. As browser based client applications attempt to provide the same service and usability that stand-alone desktop applications do, software developers have to manage the technical constraints of operating within a browser and not having access to operating system level resources that are available to stand-alone software environments. This fundamental difference in resource availability is forcing a shift in how client-side applications are architected within browser based environments. In addition, features of browser-based applications need to be upgraded while already deployed on a broad spectrum of client devices. Thus, architectures and techniques that enable discrete components of a deployed browser-based application to be updated separately are desirable to creating a stable browser-based application.

SUMMARY

Embodiments of the invention provide an application gateway to enable controlled communication between application components within a browser based environment while maintaining a level of isolation of the individual application components. A dispatching application programming interface (API) wrapper and a listening API wrapper are registered for each of a plurality of application components. The registered API wrappers are used to send and receive communications from the associated application components. For example, a first application component can dispatch an action to a second application component via the first application component's dispatching API wrapper. The second application component can receive the action via the second application component's listening API wrapper. As another example, a first application component can dispatch an event that broadcasts a state to other application components via the first application component's dispatching API wrapper. A listening API wrapper of at least one other application component receives the state and may perform other functions dependent on the state.

The features and advantages described in this summary and the following detailed description are not all-inclusive. Many additional features and advantages will be apparent to one of ordinary skill in the art in view of the drawings, specification, and claims hereof.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Embodiments of the invention provide an application gateway to enable controlled communication between application components within a browser based environment while maintaining a level of isolation of the individual application components. By not directly exposing application components to each other internally or externally, the application gateway makes the application more robust and the application components less vulnerable.

In addition, the application gateway provides an environment wherein browser-based application components communicate asynchronously and asymmetrically with each other. Asynchronous communication refers to a communication that is sent by an application component at a first time and received or recognized by another application component at a second time. Asymmetrical communication refers to communication wherein the sender may not receive any feedback indicating if the sent communication is received by another application component or if the sent communication is being acted upon in any way. Benefit of such a communication system include enabling communication among various application components without any prior coordination between the components. This is particularly important for implementing component updates and integrating new components without compromising the functioning of the entire application.

Figure 1:
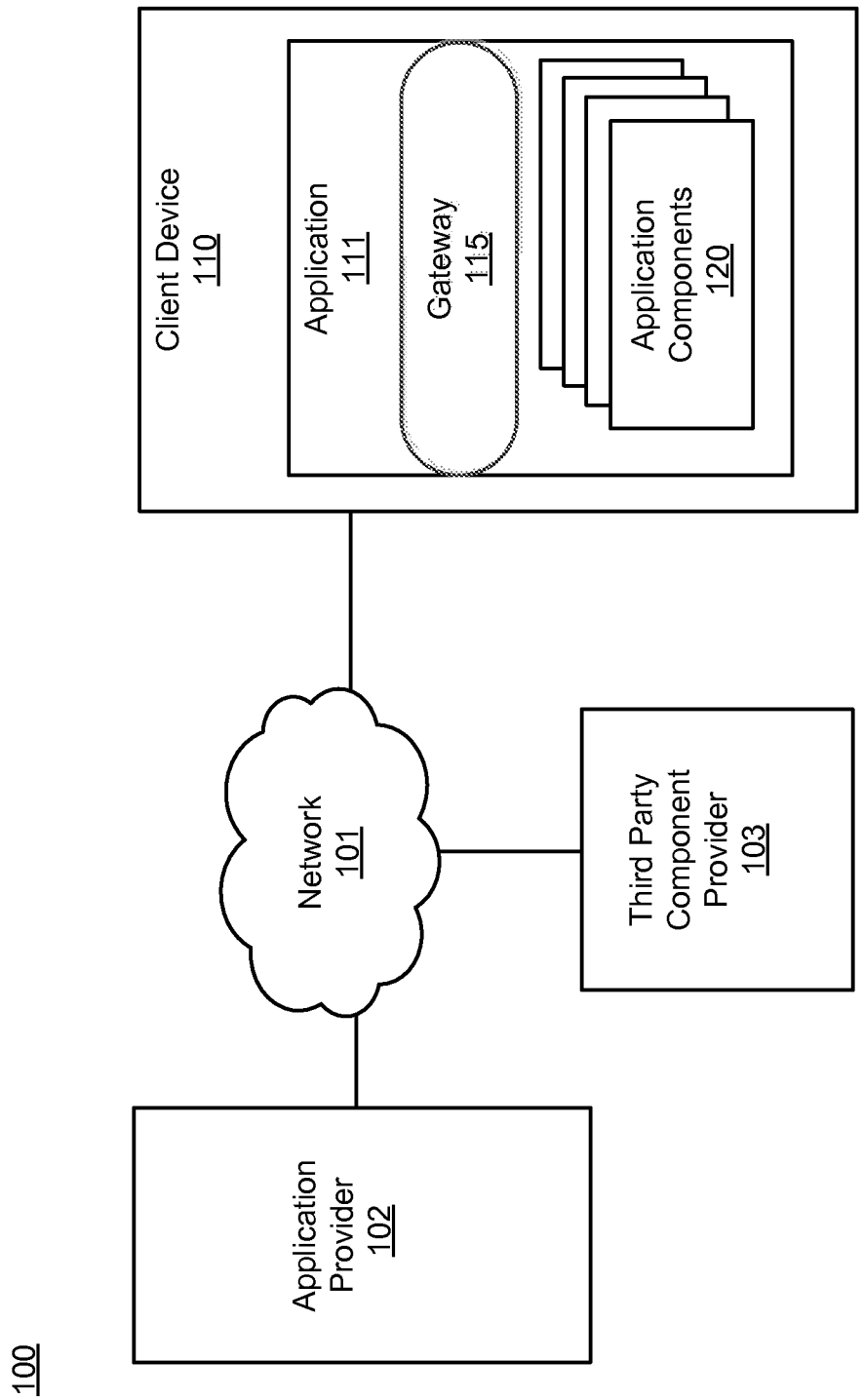
FIG. 1 illustrates a block diagram of a computing environment of an application gateway, in accordance with an embodiment of the invention.

FIG. 1 illustrates a block diagram of a computing environment 100 of an application gateway 115, in accordance with an embodiment of the invention. As illustrated in the example of FIG. 1, the computing environment 100 includes an application provider 102, a third party component provider 103, and a client device 110, connected by a communication network 101, such as the Internet. Although only one instance of the third party component provider 103 and one instance of the client device 110 are illustrated in FIG. 1 for clarity, any number of third party component providers and client devices may be connected to the network 101.

The application provider 102 provides a browser-based application 111 to the client device 110. An example of a browser-based application is an eReading application suitable for execution within the environment of a web browser, such as GOOGLE CHROME, MOZILLA FIREFOX, APPLE SAFARI, and MICROSOFT INTERNET EXPLORER. Browser-based applications typically comprise a plurality of application components 120. Each application component 120 is a discrete portion of the application 111 that performs at least one specific function, such as performing an action, changing a state, or communicating a command. For example, each component is responsible for maintaining a state of the application in memory, communicating with a server, and/or is responsible for a specific part of the user interface layer. The application components 120 are interfaced to one another through a gateway 115 and collectively define the operation of the application 111.

The third party component provider 103 can provide one or more application components 120 developed by a third party to operate as part of the browser-based application 111 provided to the client device 110. The third party application components 120 may include additional functionality developed by third parties to enhance a user's experience with the browser-based application 111.

The client device 110 receives the browser-based application 111. Examples of the client device 110 include a personal computer, such as a desktop, laptop, or tablet computer, a personal digital assistant, a smartphone, or a television "set-top box," each equipped with a web browser. The application 111 received by the client device includes application components 120 from the application provider 102 or third party component provider 103. The communication of the application components 120 with each other is controlled through a gateway 115 that enables asynchronous and asymmetric communication among the application components 120. Individual application components are isolated within individual application programming interface (API) wrappers that limit how access can be made to each of the application components, and how application components can communicate to the application 111 environment and external resources. As such, the gateway functions as an abstraction layer through which all communications with and between the application components 120 passes. The operation of the gateway 115 will be described in further detail with reference to FIGS. 2-3 below.

In one embodiment, the network 101 relays the application 111 from the application provider 102 and any third party application components 120 from third party component provider 103 to the client device 110. In some instances, the network 101 uses standard Internet communications technologies and/or protocols. Thus, the network 120 can include link technologies such as Ethernet, IEEE 802.11, IEEE 806.16, WiMAX, 3GPP LTE, integrated services digital network (ISDN), asynchronous transfer mode (ATM), and the like. Similarly, the networking protocols used on the network 101 can include the transmission control protocol/Internet protocol (TCP/IP), the hypertext transport protocol (HTTP), the simple mail transfer protocol (STMP), the file transfer protocol (FTP), and the like. The data exchanged over the network 101 can be represented using a variety of technologies and/or formats including a hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Communication in an Application Gateway Environment

Figure 2:
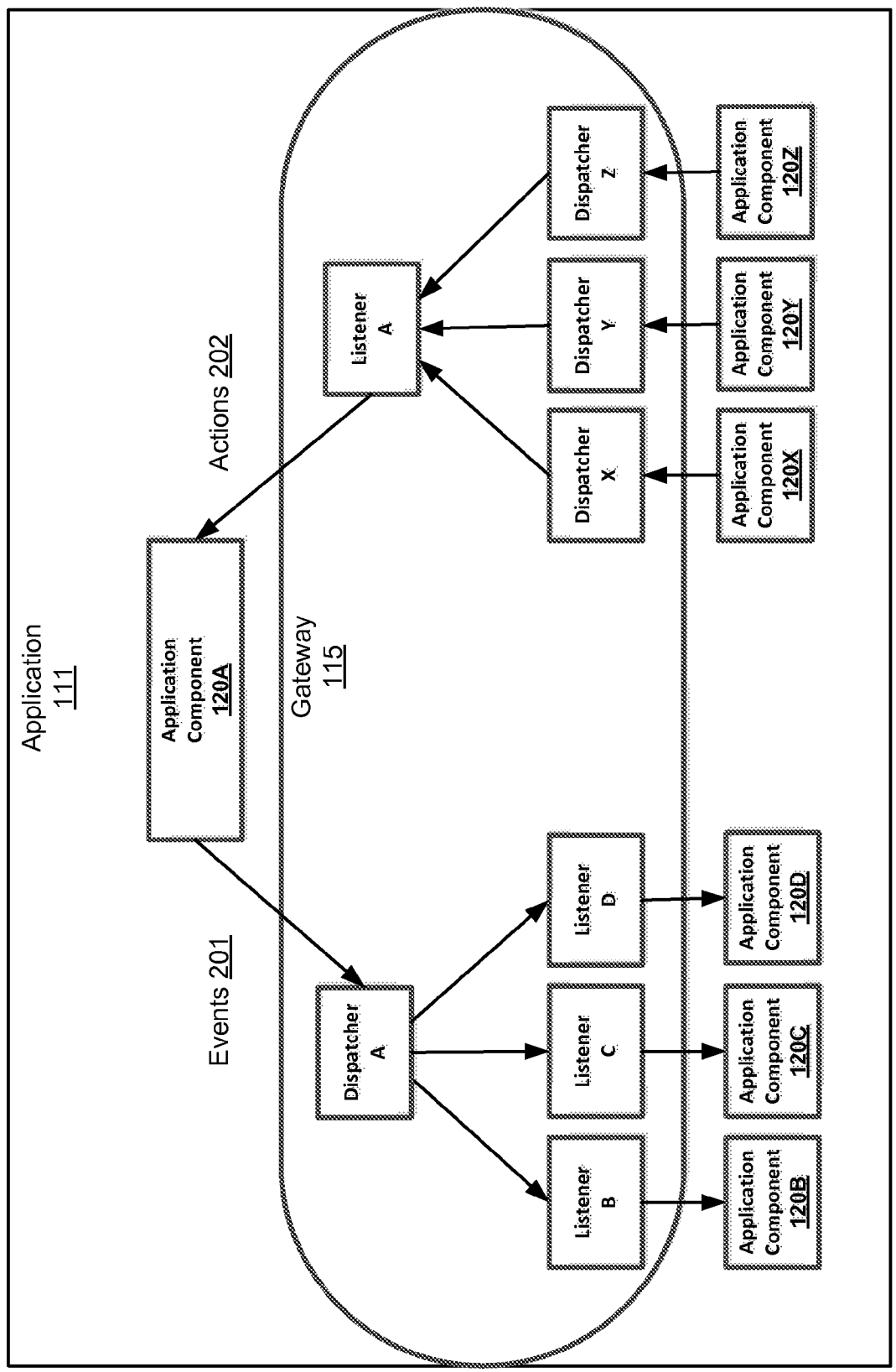
FIG. 2 is an illustration of communications between application components using an application gateway, in accordance with an embodiment of the invention.
Figure 3:
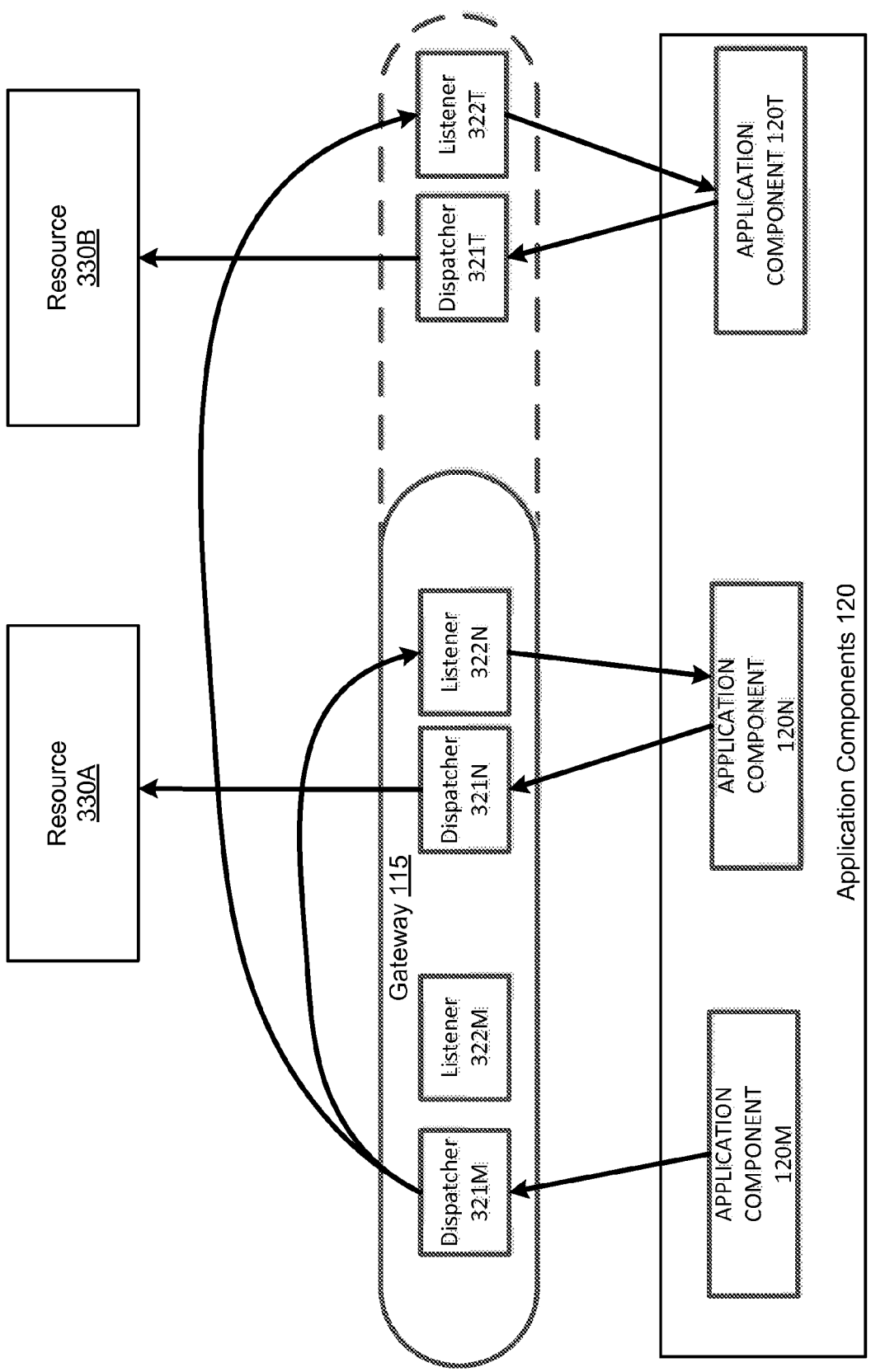
FIG. 3 is another illustration of communications between application components, including third-party components, in accordance with an embodiment of the invention.
Figure 5:
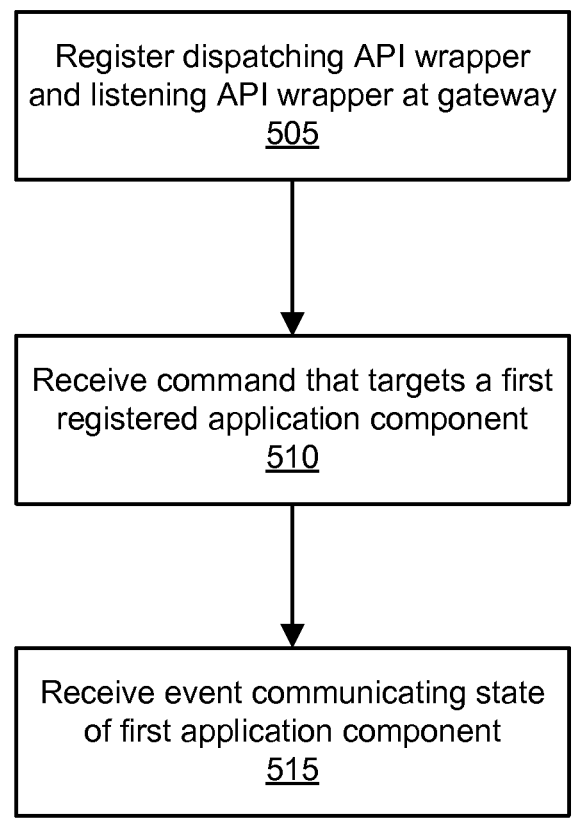
FIG. 5 is a flowchart illustrating a method for providing a communications gateway in an application environment, in accordance with an embodiment of the invention.

FIG. 2 is an illustration of communications between application components 120 using a gateway 115, in accordance with an embodiment of the invention. FIGS. 2 and 3 are further described with respect to FIG. 5, which illustrates a method for providing a communications gateway in an application environment. In this example, each of a plurality of application components 120 registers 505 both a dispatching API wrapper and a listening API wrapper at the gateway 115. For example, application component 120A has registered a dispatching API wrapper (referred to as dispatcher A) and a listening API wrapper (referred to as listener A) at the gateway 115. Registering an API comprises communicating the application component's public API to the gateway 115. Regarding the terminology used herein, "registering an action" refers to registering a unique string name to an exclusive action using a predefined API on the gateway. "Dispatching an action" refers to executing the above mentioned string, with an optional set of arguments using a predefined API on the gateway. "Listening to an event" refers to registering a non-exclusive action to a unique string using a predefined API on the gateway. "Dispatching an event" refers to commanding a wrapper to execute all actions registered to a unique string with an optional set of arguments, through a predefined API on the gateway.

In general, all communications between any application components 120 are based upon interactions between the respective components' dispatching API wrapper and listening API wrapper. These interactions will be described in the context of events 201 and actions 202. An event 201 is a change of state implemented by an application component 120. An action 202 is a command issued by an application component to another application component. Examples of component API wrapper structures are provided below:

Events
    addEvent(type, function) listen to an event
        type event name
        function a function to run when event is fired
    fireEvent(type, arguments) dispatch an event
        type event name
        arguments a list of arguments to pass to listeners
    remove Event(type, function) remove an event listener
        type event name
        function listener to remove Actions
    registerAction(name, function) register an action
        name action name
        function a function to run when action is called
    executeAction(name, arguments) dispatch an action
        name action name
    arguments an array of arguments to pass to the function The left side of FIG. 2 illustrates the communication process for an event 201. First, an application component 120A changes a state. The change in state may be prompted by user input, the expiry of a time limit, communication from another application component 120, or any other source. For example, the change in state may be the opening of a menu, the closing of a window, the updating of a score, the receipt of a notification, or any other state change that impacts the operation of the application 111.

The application component 120A communicates the change in state as an event to the application component's registered dispatcher, dispatcher A. Dispatcher A broadcasts or communicates the event 201 to any number of registered listeners that are listening for the event 201, or are listening for dispatches from Dispatcher A. In this example, listener B is the registered listening API wrapper of application component 120B, listener C is the registered listening API wrapper of application component 120C, and listener D is the registered listening API wrapper of application component 120D. Listeners A, B, and C receive the dispatched event from dispatcher A. Subsequently, listeners A, B, and C communicate the received event to their respective application components 120B, 120C, and 120D. Thus, through the gateway 115, application component 120A is enabled to communicate an event 201 to application components 120B, 120C, and 120D. These application components, in turn, may be configured to trigger other state changes and/or issue commands to other application components based on the receipt of the event 201.

The right side of FIG. 2 illustrates the communication process for an action 202. First, an application component, for example application component 120X issues a command 510. The issuance of the command may be prompted by user input, the expiry of a time limit, communication from another application component 120, or any other source. Each command is mapped to exactly one target application component to perform a specified function. Advantageously, having an action mapped to exactly one target application component allows the creation of a robust testing environment for individual application components, since mocking a particular behavior (such as a command from an application component) is easily accomplished. However, multiple application components 120, such as application components 120X, 120Y, and 120Z may issue commands that are mapped to the same target application component, in this example application component 120A, to perform the same function. For example, the command may be to open a menu, close a window, update a score, send a notification, or to perform any other function within the application 111. Thus, for example, multiple different application components 120X, 120Y, and 120Z may each issue a command to application component 120A to close a window.

FIG. 3 is another illustration of communications between application components, including third-party components, in accordance with an embodiment of the invention. The illustration includes application components 120; application gateway 115 comprising dispatchers 321M, 321N, 321T, and listeners 322M, 322N, 322T; and resources 330A, 330B. In this example, application component 120T is a third party component that has been provided by a third party component provider 103. The application gateway 115 is optionally extended to include registered dispatching and listening API wrappers 321T, 322T of the third party component 120T. As such, the third party component 120T may coexist with internal application components 120M, 120N in an system that enables controlled communications between internal and third party components 120 without having to expose access to the internal application components 120M, 120N in a way that leaves them more vulnerable to attacks and false commands.

Alternatively, communication between application components, including third-party components can be architected based on the presence of multiple gateways, including both an internal gateway designed to allow internal application components 120 to interact only with each other, and an external gateway designed to allow limited and controlled access for third party provided components to internal application components. The use of an external gateway is particularly useful when considering the extensibility of the application 111. Specifically, by publishing wrapper APIs through the external gateway, third party developers can design and add components that can be seamlessly integrated with deployed browser-based applications 111.

As described above, the gateway 115 registers both dispatching API wrappers and listening API wrappers for each of a plurality of application components 120. For example, an application component 120M has a dispatching API wrapper 321M and a listening API wrapper 322M registered at the gateway 115. Similarly, application component 120N has a dispatching API wrapper 321N and a listening API wrapper 322N registered at the application gateway 115, and application component 120T has a dispatching API wrapper 321T and a listening API wrapper 322T registered at the application gateway 120.

In one embodiment, an application component 120M changes a state that is communicated as an event that is dispatched by dispatcher 321M. In this example, listener 322N and listener 322T are both listening for events of the type dispatched by dispatcher 321M, and communicate the event to their respective application components 120N and 120T.

Application components 120N and 120T may thereafter perform a function responsive to the received event. For example, the application component 120N may issue a command, which is communicated 515 as an action through the gateway 115 via the application component's dispatcher 321N to a resource 330A internal to the browser environment on the client 110. The resource 330A then executes the action.

As another example, third party application component 120T may change a state responsive to the received event. The change of state may be dispatched as an event through the gateway 115 via the application component's dispatcher 321T to a resource 330B or another application or application component external to the browser environment on the client 110, such as a third party database or other application components. The resource 330B then processes the change in state notice and/or executes other functions based on the receipt of it.

Components of a Client Device

Figure 4:
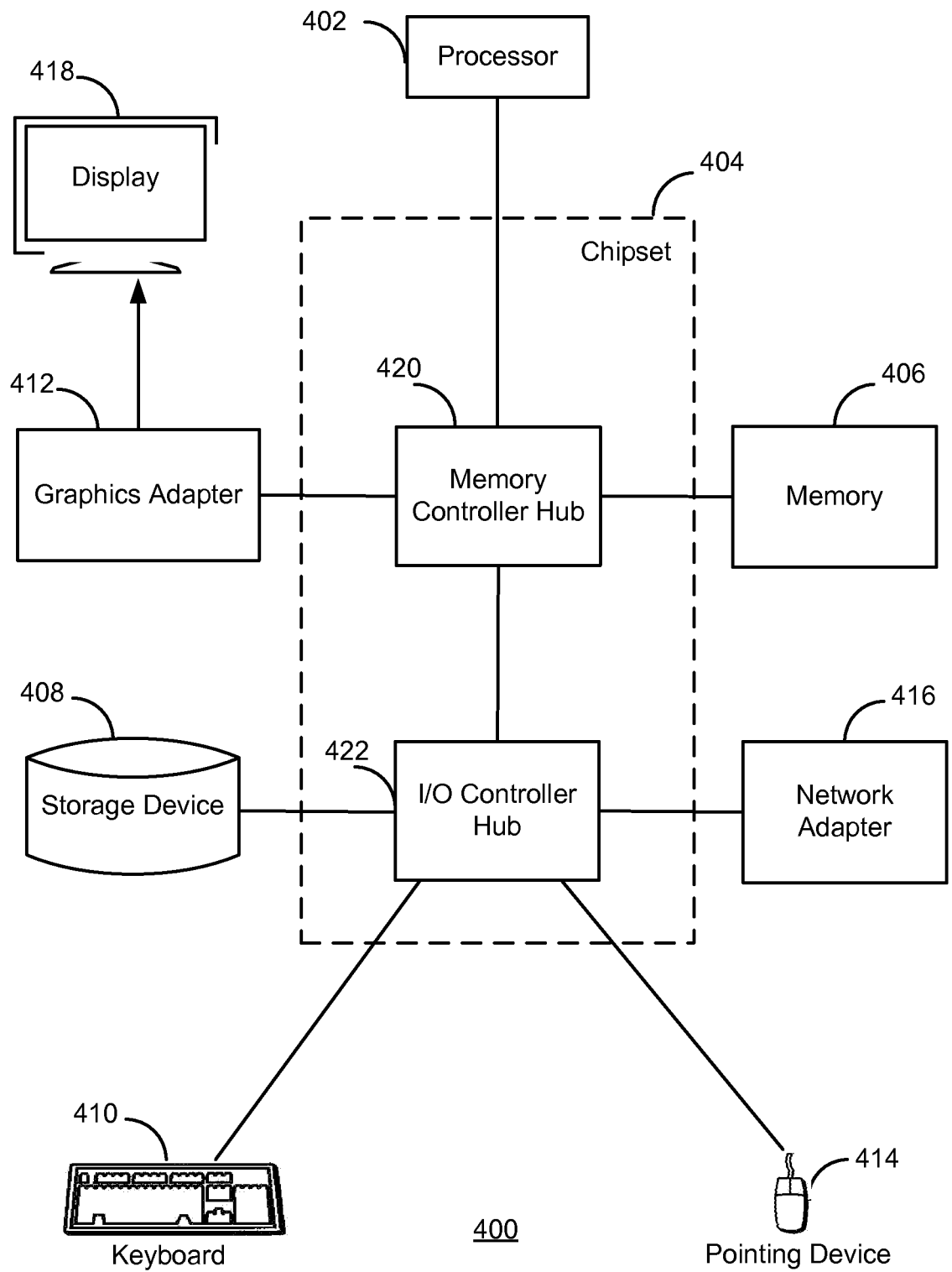
FIG. 4 is a block diagram illustrating an example computing device, in accordance with an embodiment of the invention.

FIG. 4 is a high-level block diagram illustrating an example of a computer 400 for use as a client device 110 according to one embodiment of the present disclosure. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an input/output (I/O) controller hub 422. In another embodiment, the memory 406 is coupled directly to the processor 402 instead of the chipset 404.

The storage device 408 is a non-transitory computer-readable storage medium such as a hard drive, compact disk read-only memory (CD-ROM), DVD, or a solid-state memory device. The memory 406 holds instructions and data used by the processor 402. In some embodiments, the display device 418 is a touch-sensitive display. The display device 418 can be used alone or in combination with the keyboard 410 and/or pointing device 414 to input data into the computer 400. The graphics adapter 412 displays images and other information on the display device 418. The network adapter 416 couples the computer 400 to a network, such as network 101. Some embodiments of the client device 110 have different and/or other components than those shown in FIG. 4.

The client device 110 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 408, loaded into the memory 406, and executed by the processor 402.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method of providing a communications gateway between software components of a browser-based software application, the method comprising:
   registering at the gateway a first dispatching application programming interface (API) wrapper and a first listening API wrapper for a first component of the browser-based software application the first application component performing a first function of the application;
   registering at the gateway a second dispatching API wrapper and a second listening API wrapper for a second component of the browser-based software application, the second application component performing a second function of the application;
   receiving an action at the gateway that targets the first application component, the first application component's listening API wrapper receiving the action for execution by the first application component; and
   receiving, after the execution of the action, an event at the gateway that communicates a state of the first application component, the first application component's dispatching API wrapper broadcasting the state, and the listening API wrapper of the second application component receiving the state.

2. The method of claim 1, wherein at least one of the first application component and the second application component is provided by a third party.

3. The method of claim 1, wherein reception of the action at the gateway is asynchronous from a change in the state of the first application component caused by the action.

4. The method of claim 1, wherein the only communication between the first application component and the second application component is provided by the gateway.

5. The method of claim 1, wherein the action is a command for execution by the first application component.

6. The method of claim 1, wherein the action can only be received by the first application component's listening API wrapper.

7. The method of claim 1, further comprising:
   registering at the gateway, a third listening API wrapper for a third component of the browser-based software application;
   wherein the state is further received by the third listening API wrapper.

8. The method of claim 1, further comprising:
   registering at the gateway a plurality of other dispatching API wrappers and listening API wrappers for each of a plurality of other application components;
   wherein the first application component, the second application component, and the plurality of other application components collectively define operation of the application.

9. A non-transitory computer-readable storage medium storing executable computer program instructions for providing a communications gateway between software components of a browser-based software application, the computer program instructions comprising instructions for:

registering at the gateway a first dispatching application programming interface (API) wrapper and a first listening API wrapper for a first component of the browser-based software application the first application component performing a first function of the application;

registering at the gateway a second dispatching API wrapper and a second listening API wrapper for a second component of the browser-based software application, the second application component performing a second function of the application;

receiving an action at the gateway that targets the first application component, the first application component's listening API wrapper receiving the action for execution by the first application component; and receiving, after the execution of the action, an event at the gateway that communicates a state of the first application component, the first application component's dispatching API wrapper broadcasting the state, and the listening API wrapper of the second application component receiving the state.

10. The storage medium of claim 9, wherein at least one of the first application component and the second application component is provided by a third party.

11. The storage medium of claim 9, wherein reception of the action at the gateway is asynchronous from a change in the state of the first application component caused by the action.

12. The storage medium of claim 9, wherein the only communication between the first application component and the second application component is provided by the gateway.

13. The storage medium of claim 9, wherein the action is a command for execution by the first application component.

14. The storage medium of claim 9, wherein the action can only be received by the first application component's listening API wrapper.

15. The storage medium of claim 9, further comprising computer program instructions for:

registering at the gateway, a third listening API wrapper for a third component of the browser-based software application;

wherein the state is further received by the third listening API wrapper.

16. The storage medium of claim 9, further comprising computer program instructions for:

registering at the gateway a plurality of other dispatching API wrappers and listening API wrappers for each of a plurality of other application components;

wherein the first application component, the second application component, and the plurality of other application components collectively define operation of the application.

\* \* \* \* \*